United States Patent
Wang et al.

(10) Patent No.: US 11,128,416 B2
(45) Date of Patent: Sep. 21, 2021

(54) FEEDBACK INFORMATION TRANSMISSION METHOD AND APPARATUS

(71) Applicant: HUAWEI TECHNOLOGIES CO., LTD., Guangdong (CN)

(72) Inventors: Ting Wang, Shanghai (CN); Shengyue Dou, Shanghai (CN); Yuanjie Li, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 52 days.

(21) Appl. No.: 16/589,365

(22) Filed: Oct. 1, 2019

(65) Prior Publication Data

US 2020/0036489 A1    Jan. 30, 2020

Related U.S. Application Data

(63) Continuation of application No. PCT/CN2018/081190, filed on Mar. 29, 2018.

(30) Foreign Application Priority Data

Apr. 28, 2017  (CN) .......................... 201710290239.0

(51) Int. Cl.
*H04L 5/00* (2006.01)
*H04W 72/04* (2009.01)
*H04L 1/16* (2006.01)

(52) U.S. Cl.
CPC .......... *H04L 5/0035* (2013.01); *H04L 1/1671* (2013.01); *H04L 5/0053* (2013.01); *H04W 72/0413* (2013.01)

(58) Field of Classification Search
CPC ... H04L 5/0035; H04L 1/1671; H04L 5/0053; H04L 1/1664; H04L 1/1861;
(Continued)

(56) References Cited

U.S. PATENT DOCUMENTS

2011/0038329 A1    2/2011  Luo et al.
2011/0317653 A1*  12/2011  Kwon ................... H04L 5/0055
                                                      370/329
(Continued)

FOREIGN PATENT DOCUMENTS

CN      101790240 A      7/2010
CN      101841495 A      9/2010
(Continued)

OTHER PUBLICATIONS

Extended European Search Report issued in European Application No. 18790387.7 dated Feb. 14, 2020, 8 pages.
(Continued)

*Primary Examiner* — Magdi Elhag
(74) *Attorney, Agent, or Firm* — Fish & Richardson P.C.

(57) ABSTRACT

This application provides a feedback information transmission method and an apparatus. An example method includes: receiving, by a terminal device, M data blocks corresponding to control information of N downlink control channels, where the M data blocks are carried on a same carrier, N is a positive integer greater than or equal to 2, and M is a positive integer greater than or equal to 2; determining, by the terminal device, a target resource; and sending, by the terminal device, feedback information for the M data blocks on the target resource.

20 Claims, 5 Drawing Sheets

(58) Field of Classification Search
CPC . H04L 1/1864; H04L 1/16; H04L 5/00; H04L 1/1607; H04W 72/0413
See application file for complete search history.

(56) References Cited

U.S. PATENT DOCUMENTS

| | | | |
|---|---|---|---|
| 2012/0002611 A1 | 1/2012 | You et al. | |
| 2013/0223299 A1 | 8/2013 | Yang et al. | |
| 2013/0258914 A1 | 10/2013 | Seo et al. | |
| 2014/0133437 A1* | 5/2014 | Papasakellariou | H04L 5/0057 370/329 |
| 2014/0161060 A1 | 6/2014 | Nam et al. | |
| 2015/0003330 A1 | 1/2015 | Morita | |
| 2015/0215081 A1 | 7/2015 | Chae et al. | |
| 2018/0013522 A1* | 1/2018 | Liu | H04L 5/0055 |
| 2019/0074944 A1* | 3/2019 | Kishiyama | H04L 27/2607 |
| 2019/0357184 A1* | 11/2019 | Tang | H04W 72/0453 |

FOREIGN PATENT DOCUMENTS

| | | |
|---|---|---|
| CN | 102474395 A | 5/2012 |
| CN | 107872303 A | 4/2018 |
| EP | 3145104 A1 | 3/2017 |

OTHER PUBLICATIONS

Huawei et al., "WF on Coordinated Transmission Scheme," 3GPP TSG RAN WG1 NR Ad Hoc Meeting, R1-1701337, Spokane, USA, Jan. 16-20, 2017, 3 pages.

PCT International Search Report and Written Opinion issued in International Application No. PCT/CN2018/081190 dated Jun. 21, 2018, 17 pages (with English translation).

Office Action issued in Chinese Application No. 201710290239.0 dated Aug. 28, 2020, 16 pages (with English translation).

\* cited by examiner

FEEDBACK INFORMATION TRANSMISSION METHOD AND APPARATUS

CROSS-REFERENCE TO RELATED APPLICATIONS

This application is a continuation of International Application No. PCT/CN2018/081190, filed on Mar. 29, 2018, which claims priority to Chinese Application No. 201710290239.0, filed on Apr. 28, 2017. The disclosures of the aforementioned applications are hereby incorporated by reference in their entireties.

TECHNICAL FIELD

The present invention relates to the field of communications technologies, and more specifically, to a feedback information transmission method and an apparatus.

BACKGROUND

With development of communication technologies, a coordinated multipoint multi-stream transmission technology, for example, a coordinated multipoint transmission (CoMP) technology is proposed, so that a plurality of transmission points can transmit a plurality of pieces of data by using a same carrier. For example, a plurality of geographically separated transmission points cooperate to transmit a physical downlink shared channel (PDSCH) to one terminal device. In other words, the terminal device can receive a plurality of pieces of data from a plurality of different transmission points by using one carrier.

In coordinated multipoint multi-stream transmission, a plurality of transmission points transmit different pieces of data to a single terminal device on a same carrier. All the transmission points respectively transmit different pieces of data, in other words, transport blocks (TB). Each transmission point can transmit a maximum of two TBs.

It is expected to provide a technology that can be used to perform acknowledgment feedback for data reception in the coordinated multipoint multi-stream transmission technology.

SUMMARY

Embodiments of the present invention provide a feedback information transmission method and an apparatus, to support acknowledgment feedback performed for data reception in a coordinated multipoint multi-stream transmission technology.

According to a first aspect, a feedback information transmission method is provided, where the method includes: receiving, by a terminal device, M data blocks corresponding to control information of N downlink control channels, where the M data blocks are carried on a same carrier, N is a positive integer greater than or equal to 2, M is a positive integer greater than or equal to 2, and the N pieces of downlink control information are corresponding to the N downlink control channels; determining, by the terminal device, a target resource; and sending, by the terminal device, feedback information for the M data blocks on the target resource.

It should be noted that the terminal device sends the feedback information for the M data blocks on the target resource in a preset format, where the preset format is obtained from pre-stored information in the terminal device, or is obtained from the N pieces of downlink control information.

Further, it should be noted that the preset format includes a quantity of bits of the feedback information. For example, the quantity of bits may be 1 bit, 2 bits, or 4 bits. This is not listed one by one herein.

The sending, by the terminal device, feedback information for the M data blocks on the target resource includes: sending, by the terminal device, the feedback information for the M data blocks on the target resource based on the quantity of bits of the feedback information.

Further, it should be noted that the preset format includes an arrangement order of the feedback information.

The sending, by the terminal device, feedback information for the M data blocks on the target resource includes: sending, by the terminal device, the feedback information for the M data blocks on the target resource based on the arrangement order of the feedback information.

It may be understood that when the preset format includes an arrangement order of the feedback information and a quantity of bits of the feedback information, the terminal device sends the feedback information for the M data blocks on the target resource based on the arrangement order of the feedback information and the quantity of bits of the feedback information.

Specifically, the terminal device determines a quantity of symbols or slots corresponding to the target resource; and determines the arrangement order of the feedback information based on the quantity of symbols or slots corresponding to the target resource. The sending, by the terminal device, feedback information for the M data blocks on the target resource includes: sending, by the terminal device, the feedback information for the M data blocks on the target resource based on the arrangement order of the feedback information.

With reference to the first aspect, in a first possible implementation in the present invention, the terminal device determines the target resource based on configuration information, where the configuration information is information pre-stored in the terminal device, higher layer signaling, physical layer signaling, or information carried on the N downlink control channels.

Specifically, when the configuration information is information carried on a downlink control channel, the configuration information further includes piggyback indication information, and the piggyback indication information is used to indicate whether to perform piggyback feedback.

That the terminal device determines the target resource based on configuration information includes: When the piggyback indication information indicates that piggyback feedback is to be performed, the terminal device determines, as the target resource, a resource corresponding to an uplink data channel. The sending, by the terminal device, feedback information for the M data blocks on the target resource includes: sending, by the terminal device on the target resource, feedback information for a data block corresponding to the piggyback indication information. When the piggyback indication information indicates that piggyback feedback is not to be performed, the terminal device determines, as the target resource, a resource corresponding to an uplink control channel. The sending, by the terminal device, feedback information for the M data blocks on the target resource includes: sending, by the terminal device on the target resource, feedback information for a data block corresponding to the piggyback indication information.

With reference to the first aspect, in a second possible implementation in the present invention, the determining, by the terminal device, a target resource includes: determining, by the terminal device, the target resource based on the N downlink control channels.

Details are as follows:

The terminal device determines, based on control channel elements in which the N downlink control channels are located, a target resource corresponding to each downlink control channel. The sending, by the terminal device, feedback information for the M data blocks on the target resource includes: sending, by the terminal device on the target resource corresponding to each downlink control channel, feedback information for each data block corresponding to each downlink control channel.

The terminal device determines, based on control resource setting identifiers or search space setting identifiers included in the N downlink control channels, a target resource corresponding to each downlink control channel. The sending, by the terminal device, feedback information for the M data blocks on the target resource includes: sending, by the terminal device on the target resource corresponding to each downlink control channel, feedback information for each data block corresponding to each downlink control channel.

According to a second aspect, a feedback information transmission method is provided, where the method includes: determining, by a transmission point, information about a resource used to carry feedback information; and sending, by the transmission point, the information about the resource to a terminal device, so that the terminal device sends the feedback information by using the resource.

With reference to the second aspect, it should be further noted that the transmission point needs to determine a quantity of bits for feedback and a feedback format.

Specifically, the transmission point determines a quantity of bits of the feedback information, and sends the quantity of bits of the feedback information to the terminal device, so that the terminal device performs feedback based on the quantity of bits. Specifically, the transmission point determines a position of the feedback information, and sends the position of the feedback information to the terminal device, so that the terminal device sends the feedback information in the position.

With reference to the second aspect, it should be further noted that the transmission point further needs to feed back whether to perform piggyback feedback.

Specifically, the transmission point sends piggyback indication information to the terminal device, so that the terminal device sends the feedback information based on the piggyback indication information, where the piggyback indication information is used to indicate whether to perform piggyback feedback.

According to a third aspect, a terminal device is provided, and includes units configured to perform steps of the feedback information transmission method in the first aspect and the implementations of the first aspect.

According to a fourth aspect, a transmission point is provided, and includes units configured to perform steps of the feedback information transmission method in the second aspect and the implementations of the second aspect.

According to a fifth aspect, a terminal device is provided, and includes a transceiver, a memory, and a processor. The memory is configured to store a computer program, and the processor is configured to invoke the computer program from the memory and run the computer program, so that a feedback information transmission device performs the feedback information transmission method in any one of the first aspect or the implementations of the first aspect.

According to a sixth aspect, an access device or a transmission point is provided, and includes a transceiver, a memory, and a processor. The memory is configured to store a computer program, and the processor is configured to invoke the computer program from the memory and run the computer program, so that a feedback information transmission device performs the feedback information transmission method in any one of the second aspect or the implementations of the second aspect.

According to a seventh aspect, a computer program product is provided, where the computer program product includes computer program code, and when the computer program code is run by a receiving unit, a processing unit, and a sending unit or a receiver, a processor, and a transmitter of a terminal device, the terminal device performs the feedback information transmission method in any one of the first aspect or the implementations of the first aspect.

According to an eighth aspect, a computer program product is provided, where the computer program product includes computer program code, and when the computer program code is run by a receiving unit, a processing unit, and a sending unit or a receiver, a processor, and a transmitter of a transmission point, the transmission point performs the feedback information transmission method in any one of the second aspect or the implementations of the second aspect.

According to a ninth aspect, a computer readable storage medium is provided, where the computer readable storage medium stores a program, and the program enables a terminal device to perform the feedback information transmission method in any one of the first aspect or the implementations of the first aspect.

According to a tenth aspect, a computer readable storage medium is provided, where the computer readable storage medium stores a program, and the program enables a transmission point to perform the feedback information transmission method in any one of the second aspect or the implementations of the second aspect.

According to the feedback information transmission method and the apparatus in the embodiments of the present invention, in the coordinated multipoint multi-stream transmission technology, after receiving, by using a same carrier, a plurality of pieces of data transmitted by a plurality of transmission points, the terminal device sends feedback information for the plurality of pieces of data to the plurality of transmission points by using one or more time-frequency resources, so that the plurality of transmission points can learn of a receiving status of the transmitted data, and acknowledgment feedback can be performed for data reception in the coordinated multipoint multi-stream transmission technology.

BRIEF DESCRIPTION OF DRAWINGS

To describe the technical solutions in the embodiments of the present invention more clearly, the following briefly describes the accompanying drawings required for describing the embodiments of the present invention.

DESCRIPTION OF EMBODIMENTS

Figure 1:
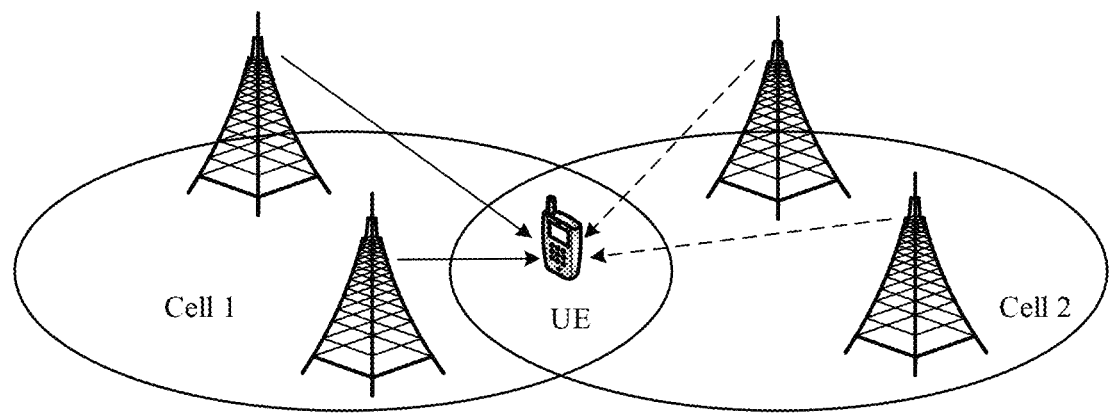
FIG. 1 is a schematic diagram of a scenario in which a plurality of antenna sites perform coordinated transmission according to an embodiment of the present invention.

The following describes technical solutions in the embodiments of the present invention with reference to the accompanying drawings in the embodiments of the present invention.

It should be understood that the technical solutions in this application may be specifically applied to various communications systems, for example: a global system for mobile communications (GSM), a code division multiple access (CDMA) system, a wideband code division multiple access (WCDMA) system, a time division-synchronous code division multiple access (TD-SCDMA) system, a universal mobile telecommunication system (UMTS), and a long term evolution (LTE) system. With continuous development of communications technologies, the technical solutions in this application may be further applied to a future network, for example, a 5th generation mobile communication technology (5G) system, which may also be referred to as an NR (new radio) system, or the technical solutions may be applied to a D2D (device to device) system, an M2M (machine to machine) system, or the like.

In this application, a terminal device may include or may also be referred to as user equipment (UE), a terminal, a mobile console (MS), a mobile terminal, a subscriber unit (SU), a subscriber station (SS), a mobile station (MB), a remote station (RS), an access point (AP), a remote terminal (RT), an access terminal (AT), a user terminal (UT), a user agent (UA), a user apparatus (UD), or the like. This is not limited in this application. The terminal device may be a wireless terminal or a wired terminal. The wireless terminal may be a device that provides a user with voice and/or data connectivity, a handheld device with a wireless connection function, or another processing device connected to a wireless modem, and the wireless device may communicate with one or more core networks by using a radio access network (RAN). For example, the terminal device may be a mobile terminal, for example, a mobile phone (or referred to as a "cellular" phone) and a computer having a mobile terminal, or may be a portable, pocket-sized, handheld, computer built-in, or vehicle-mounted mobile apparatus, for example, a personal communications service (PCS) phone, a cordless phone, a session initiation protocol (SIP) phone, a wireless local loop (WLL) station, or a personal digital assistant (PDA), which exchanges voice and/or data with a radio access network.

A transmission point (TP) in this application may be a base station. It should be noted that the base station is a device communicating with user equipment by using one or more sectors on an air interface in an access network, and the base station can coordinate attribute management of the air interface. For example, the base station may be a base station in a GSM or CDMA, for example, a base transceiver station (BTS), or may be a base station in WCDMA, for example, a NodeB, or may be an evolved base station in LTE, for example, an eNB or an e-NodeB (evolutional NodeB), or may be a base station in a 5G system, for example, a gNB, or a base station in a future network.

A multiple input multiple output (MIMO) technology and a coordinated multipoint transmission (CoMP) technology are used in this application.

The MIMO technology may also be referred to as a multi-antenna technology, and can improve system reliability through space diversity, increase a system capacity through spatial multiplexing, and improve cell coverage through beamforming. Therefore, the MIMO technology is considered as one of key technologies for implementing data transmission with a high rate and high quality in future mobile communication. As one of key technologies in a MIMO system, a precoding technology is applied to a transmit end, to minimize a correlation between signals on different transmit antennas when the signals arrive at a user (corresponding to space diversity), minimize interference between signals on different antennas when the signals arrive at a receive antenna (corresponding to spatial multiplexing), and maximize an array gain between a plurality of antennas (corresponding to beamforming).

The CoMP is considered as an effective method for resolving a problem of interference between cells and improving an edge user throughput. The CoMP means that a plurality of geographically separated transmission points cooperate to transmit data such as a physical downlink shared channel (PDSCH) to one terminal, or jointly receive data such as a physical uplink shared channel (PUSCH) sent by one terminal. Joint transmission (JT) is one of typical transmission modes of the CoMP. In joint transmission, an interference signal is converted into a wanted signal in a manner in which a plurality of transmission points simultaneously send data to one terminal device, so that communication quality of a link is improved, and a user throughput is improved. There are two types of existing joint transmission technologies. One is coherent JT, to be specific, a plurality of antennas from a plurality of different transmission points jointly perform precoding to transmit data to a terminal device, so as to implement spatial diversity or spatial multiplexing. The transmission is similar to conventional MIMO transmission, but a difference is that the plurality of transmit antennas used for MIMO transmission are distributed at different transmission points. The other is non-coherent JT, to be specific, different transmission points transmit identical data to a same terminal device, and this is equivalent to power superposition of a plurality of signals on a terminal device side, so as to increase a receive signal to interference plus noise ratio (SINR) of the terminal device.

A coordinated multipoint multi-stream transmission technology is an enhanced transmission technology based on existing CoMP non-coherent JT transmission. The coordinated multipoint multi-stream transmission technology may be considered as distributed MIMO, to be specific, a plurality of transmission points cooperate to transmit different data streams to one terminal device on a same time-frequency resource. The transmission points separately perform precoding and separately transmit different code blocks/data streams, to implement non-coherent distributed MIMO. Compared with coherent JT transmission, the non-coherent distributed MIMO has a low requirement for synchronization and is easy to implement. In addition, in comparison with transmission MIMO, more data streams/code blocks may be transmitted on one time-frequency resource in such a transmission mode, so that a data transmission rate of a user and a system throughput can be significantly improved. In coordinated multipoint multistream transmission, two or more transmission points separately perform precoding and send different data streams or different code blocks to a same terminal device. However, in current CoMP joint transmission, different transmission points transmit a same data stream, or a plurality of transmission points jointly perform precoding, to form coherent joint transmission.

In main scenarios in the embodiments of the present invention, based on existing CoMP multipoint transmission, an existing MIMO technology (including a diversity technology for improving transmission reliability and a multistream technology for increasing a data transmission rate) is combined with coordinated multipoint transmission to form a distributed multi-antenna system, so as to better serve a user. FIG. 1 is a schematic diagram of a scenario in which a plurality of antenna sites perform coordinated transmission. This embodiment of the present invention is applicable to both a homogeneous network scenario and a heterogeneous network scenario, and no limitation is imposed on a transmission point. Coordinated multipoint transmission may be performed between macro base stations, between micro base stations, or between a macro base station and a micro base station. This embodiment of the present invention is applicable to both an FDD system and a TDD system, and is applicable to both a low-frequency scenario and a high-frequency scenario.

A control channel in this application is mainly used to carry resource scheduling information and other control information. For example, the control channel may be a physical downlink control channel (PDCCH), an enhanced physical downlink control channel (EPDCCH), a new radio physical downlink control channel (NR-PDCCH), or another downlink channel that has the foregoing functions and that is defined with network evolution, or may be an uplink control channel, for example, a physical uplink control channel (PUCCH). In this application, a PDCCH is used as an example for description. In this application, a channel may also be referred to as a signal or another name. This is not limited in this application.

In this application, a time cell is a unit corresponding to one type of time unit. The time unit is a time unit or a scheduling unit that is in time domain and that is used for information transmission. The time cell includes an integer quantity of symbols in time domain. For example, the time unit may refer to a subframe, or may refer to a slot, or may refer to a radio frame, a mini-slot (or sub slot), a plurality of aggregated slots, or a plurality of aggregated subframes, symbols, or the like, or may refer to a transmission time interval (TTI). This is not limited in this application. In time domain, one or more time cells corresponding to one type of time unit in time domain may include an integer quantity of time cells corresponding to another type of time unit, or a length of one or more time cells corresponding to one type of time unit in time domain is equal to a total length of an integer quantity of time cells corresponding to another type of time unit. For example, one mini-slot/slot/subframe/radio frame includes an integer quantity of symbols, one slot/subframe/radio frame includes an integer quantity of mini-slots, one subframe/radio frame includes an integer quantity of slots, one radio frame includes an integer quantity of subframes, and the like. Alternatively, there may be another example indicating an inclusion relationship. This is not limited in this application.

This application discloses a feedback information transmission method and an apparatus, so that a terminal device can implement ACK/NACK feedback of a plurality of PDCCHs, thereby improving information transmission efficiency and reliability.

Figure 2:
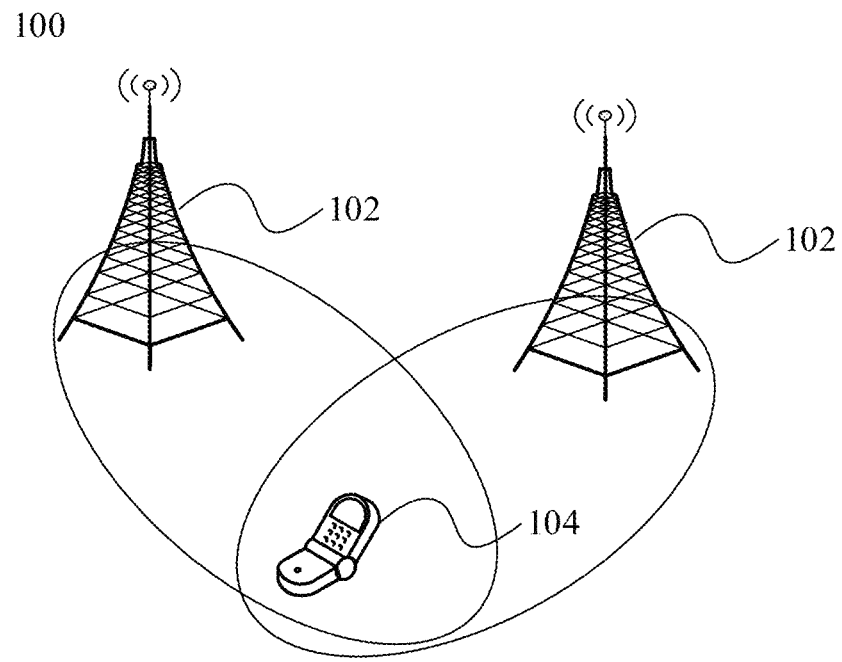
FIG. 2 is a schematic diagram of a communications system 100 for transmitting feedback information according to an embodiment of the present invention.

FIG. 2 is a schematic diagram of a communications system 100 that is used for transmitting feedback information and that is applicable to the present invention. As shown in FIG. 2, the communications system 100 includes at least two transmission points 102 (and at least one terminal device 104). In the communications system 100, the at least two transmission points 102 may belong to a same cell or different cells, and data transmitted by the at least two transmission points 102 may include same data or different data. This is not specifically limited in the present invention. It should be understood that quantities of transmission points and terminal devices included in the communications system 100 shown in FIG. 2 are merely examples for description, and this is not specifically limited in the present invention.

It may be understood that a transmission point may communicate with a terminal device by using various communications systems, for example, the 5G system, also referred to as the NR system, in the foregoing wireless communications system, or an LTE system, so as to implement information transmission. When the transmission point and the terminal device perform information transmission, the terminal device needs to listen to and attempt to decode all PDCCH candidate positions in one time cell (for example, a subframe), and the candidate resources include one or more PDCCHs that need to be listened to.

In this application, the transmission point configures a plurality of PDCCHs for the same terminal device in one time cell by using different PDCCH search space, or configures a plurality of PDCCHs for the same terminal device by using same PDCCH search space. Optionally, the plurality of PDCCHs may be sent by using a same beam (in other words, sent by using one beam), or may be sent by using different beams, so that one terminal device can receive a plurality of PDCCHs. Each of the plurality of PDCCHs may include downlink scheduling information, or may include uplink scheduling information. In this application, the PDCCH search space includes at least one control channel element (CCE), and may specifically include a total quantity of CCEs in a control region of one time unit such as a subframe. A CCE is a basic unit of a control channel resource. The CCE may include one or more resource element groups (REG). An REG includes one or more resource elements REs, and an RE is a basic resource unit. For example, one RE in LTE is one subcarrier in frequency domain and one symbol in time domain. Further, the search space may include one or more PDCCH candidate resources. The candidate resources may be related to an aggregation level. The aggregation level may indicate a specific quantity of CCEs used to transmit one PDCCH or a specific quantity of CCE resources on which one PDCCH is carried.

It may be understood that the transmission point sends data to the terminal device, and the terminal device may determine feedback information for the received data based on a reception status of the data (for example, a decoding status of the received data), and send the feedback information to each transmission point. It may be understood that there may be one or more transmission points.

Figure 3:
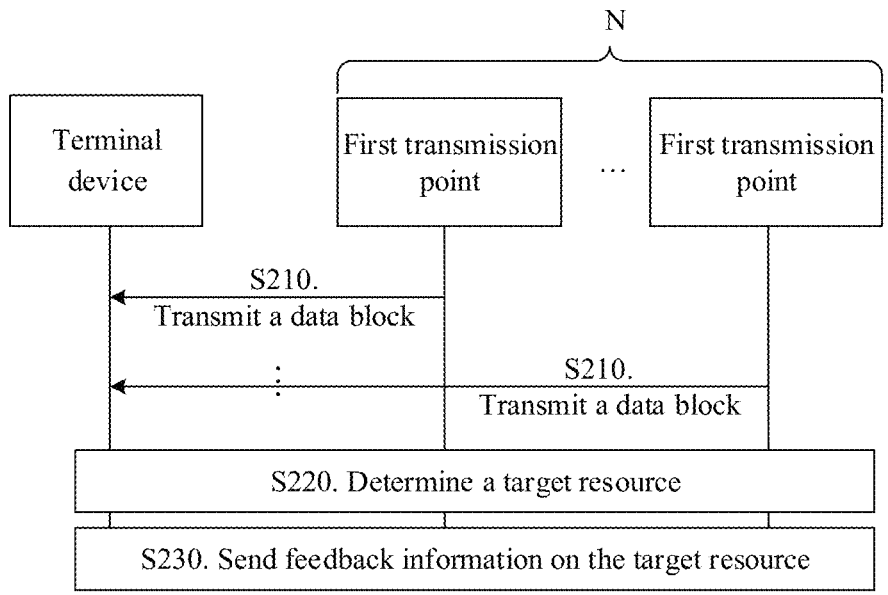
FIG. 3 is a schematic interaction diagram of a feedback information transmission method according to an embodiment of the present invention.

FIG. 3 is a schematic interaction diagram of a feedback information transmission method 300 according to an embodiment of the present invention. As shown in FIG. 3, the method 300 includes the following steps.

S210. A terminal device receives M data blocks corresponding to N pieces of downlink control information, where the M data blocks are carried on a same carrier, N is a positive integer greater than or equal to 2, M is a positive integer greater than or equal to 2, and the N pieces of downlink control information are corresponding to N downlink control channels.

It may be understood that the terminal device obtains one piece of downlink control information from each downlink control channel.

The data block may be a transport block (TB), a code block (CB), a code block group (CBG), a PDSCH, or the like. This is not limited herein.

It may be understood that the terminal device receives the N pieces of downlink control information before receiving the M data blocks corresponding to the N pieces of downlink control information.

S220. The terminal device determines a target resource.

It should be noted that the terminal device may determine the target resource based on pre-stored information, or may determine the target resource based on indication information of a transmission point.

S230. The terminal device sends feedback information for the M data blocks on the target resource.

It should be noted that the terminal device sends the feedback information for the M data blocks on the target resource in a preset format. The terminal device may obtain the preset format from pre-stored information. Optionally, the preset format may be delivered by the transmission point. For example, the preset format may be included in information of a downlink control channel.

It may be understood that the preset format usually includes parameters such as a quantity of bits of the feedback information and an arrangement order of the feedback information.

For example, the quantity of bits of the feedback information may be one bit, two bits, four bits, or the like. This is not limited herein.

For example, feedback information for a serving transmission point may be arranged in a position before feedback information for a coordinated transmission point, and vice versa. This is not limited herein.

In this embodiment of the present invention, the feedback information may include ACK information or NACK information in a hybrid automatic repeat request (HARQ) technology. It should be noted that the ACK information is used to indicate that the terminal device successfully decodes received data. The NACK information is used to indicate that the terminal device does not receive downlink data, or that the terminal device fails to decode the received data. It should be understood that the foregoing enumerated content included in the feedback information is only an example for description, and the present invention is not limited thereto. Other information that can indicate a status of receiving the downlink data by the terminal device shall fall within the protection scope of the present invention. For example, the feedback information may further include discontinuous transmission (DTX) information, and the DTX information may be used to indicate that the terminal device does not receive the downlink data.

For ease of understanding and description, the following uses an example in which the feedback information includes the ACK information or the NACK information to describe in detail a processing process of S210 to S230.

Specifically, a process in which a terminal device # A sends feedback information to N transmission points is used as an example for description. The feedback information is used to indicate feedback results for different data streams from the N transmission points. In addition, the N transmission points may send M data streams (namely, M data blocks) to the terminal device # A by using a same carrier (namely, a frequency domain resource with a specified width) and by using, for example, a multipoint multi-stream transmission technology. In addition, the N transmission points may include a home transmission point of the terminal device # A, in other words, a transmission point accessed by the terminal device # A. For ease of understanding, the transmission point is denoted as a serving transmission point # A below, in other words, a cell provided by the serving transmission point # A is used as a serving cell of the terminal device # A. In addition, a transmission point other than the serving transmission point # A in the N transmission points is denoted as a coordinated transmission point.

The terminal device receives data from the serving transmission point # A and data from N−1 coordinated transmission points. In this embodiment of the present invention, downlink data transmission between the transmission points and the terminal device may be performed based on downlink control information (DCI), and a process and a method may be similar to those in the prior art. To avoid repetition, detailed descriptions are omitted herein.

It should be noted that the M data blocks may be transmitted based on N pieces of downlink control information. Certainly, the M data blocks may alternatively be transmitted based on one piece of downlink control information.

Optionally, the N pieces of downlink control information are in a one-to-one correspondence with N downlink control channels, and each piece of downlink control information is carried on a corresponding downlink control channel. To be specific, for any first transmission point Ti in the N first transmission points, the terminal device receives downlink control information T carried on a downlink control channel from the first transmission point Ti to the terminal device. The downlink control information T is used to instruct the terminal device to receive a data block Di sent by the first transmission point Ti. Specifically, in this embodiment of the present invention, each of the N transmission points may use an independent downlink control channel such as a physical downlink control channel PDCCH), in other words, each of the N transmission points may use independent downlink control information. In this case, the terminal device may receive, based on N PDCCHs (in other words, N pieces of DCI), the M data blocks sent by the N transmission points (in this case, N=M).

In the following, the N data blocks are denoted as a data block #1 to a data block # N, and the N PDCCHs are denoted as a PDCCH #1 to a PDCCH # N. In this case, the PDCCH #1 may be used to transmit control information used for controlling transmission of the data block #1, a PDCCH #2 may be used to transmit control information used for controlling transmission of the data block #2, and by analogy, the PDCCH # N may be used to transmit control information used for controlling transmission of the data block # N.

In this embodiment of the present invention, a transmission point configures a dedicated physical uplink control channel (PUCCH) resource for the terminal device, so that the terminal device performs information feedback by using the PUCCH resource. For example, the transmission point adds information about the dedicated PUCCH resource to a PDCCH.

It may be understood that the dedicated PUCCH resource is well known to both the serving transmission point and the coordinated transmission point.

Specifically, the serving transmission point and the coordinated transmission point may determine a target PUCCH resource through negotiation, and the serving transmission point or the coordinated transmission point sends information about the target PUCCH resource to the terminal device. The target PUCCH resource is the dedicated PUCCH resource.

It may be understood that the serving transmission point may determine the target PUCCH resource, and then send the information about the target PUCCH resource to the terminal device. Certainly, the serving transmission point may further send the information about the target PUCCH resource to the coordinated transmission point.

It should be noted that the information about the target PUCCH resource may include at least one of frequency domain resource information (for example, an RB position), time domain resource information (for example, a subframe, slot, mini-slot, or symbol position), a scrambling identity, and a cyclic shift.

It may be understood that the serving transmission point may transmit the information about the target PUCCH resource by using signaling.

The following signaling is used as an example:

```
PUCCH-ConfigDedicated-Cooperation ::=         SEQUENCE {
    startingPRB           INTEGER (0..109), ------ a start frequency domain
position, for example, an RB position
    numberOfPRB           INTEGER (0..7) ------ a size of an occupied
frequency domain resource, for example, a quantity of RBs
    startingSymbol/slot    INTEGER (0..14), ------ a start time domain
position, for example, a subframe, slot, or symbol position
    numberOfSymbol/slot    INTEGER (0..7) ------ a size of an occupied
time domain resource; for example, a quantity of slots or a quantity of symbols
    n1PUCCH-AN-CS         CHOICE { ------ a cyclic shift
    release                NULL,
    setup                  SEQUENCE {
    n1PUCCH-AN-CS-ListP1   SEQUENCE (SIZE (2..4)) OF
INTEGER (0..2047) ------- a cyclic shift list
    nPUCCH-Identity INTEGER (0..503), ------ a PUCCH scrambling identity
    n1PUCCH-AN            INTEGER (0..2047) ------ a resource
offset
    }
    }    OPTIONAL -- Need ON
    }, where
    n1PUCCH-AN indicates a UE-specific PUCCH AN resource offset.
```

In addition, it should be noted that a resource corresponding to the target PUCCH may alternatively be determined by using information pre-stored in the terminal device.

When feedback is performed by using the target PUCCH resource, there may be a plurality of possible feedback manners. Some feedback manners are described in this embodiment of this application. It may be understood that another feedback manner derived, based on these feedback manners, by a person skilled in the art also falls within the protection scope of this application.

Manner 1: The terminal device sends the feedback information by using one PUCCH.

The following describes in detail a scenario in which the terminal device performs feedback by using one PUCCH resource.

It should be noted that, when the terminal device performs feedback, a quantity of bits to be fed back should be fixed, and the quantity of bits to be fed back is well-known to the transmission point and the terminal device. In a case of non-ideal backhaul, each base station performs independent scheduling. Therefore, to ensure correct reception of an ACK/a NACK when scheduling performed by another base station is not determined, a fixed quantity of feedback bits may be specified, for example, four bits, two bits, or one bit. This is not limited herein. Alternatively, a specific quantity of bits may be notified by the transmission point to the terminal device by using signaling, for example, higher layer signaling or physical layer signaling. Alternatively, a new PUCCH format may be set, where the format includes a specific quantity of feedback bits, for example, a PUCCH format 6. When the terminal device is instructed to perform feedback in this format, the terminal device may know a specific quantity of feedback bits. Different formats may be corresponding to different quantities of feedback bits.

It should be further noted that there is a correspondence between positions of feedback bits of ACKs/NACKs and data corresponding to different transmission points or different PDCCHs, and the correspondence is well-known to the transmission points and the terminal device. A specific correspondence may be predefined. For example, a feedback bit of an ACK/a NACK for data corresponding to a serving transmission point is located before a feedback bit of an ACK/a NACK for data corresponding to a coordinated base station, and vice versa. It may be understood that the foregoing correspondence may be manually set, or may be determined by the serving transmission point and the coordinated transmission point through negotiation.

Alternatively, a bit position occupied by an ACK/a NACK fed back for a PDSCH corresponding to a PDCCH may be indicated in the PDCCH. For example, the bit position is indicated by using ACK/NACK position - - - Xbit. Herein, a specific value of X may be 1 (which is not limited herein), to be specific, one bit is used for feedback, where a bit value of 0 may indicate that the occupied bit position is a front position, and a bit value of 1 indicates that the occupied bit position is a back position.

A specific example is as follows: For example, when ACK/NACK feedback is four bits, a front position represents the first two bits bits, and a back position represents the last two bits bits, and vice versa. To be specific, for example, the serving transmission point transmits a PDCCH 1, and one bit in the PDCCH 1 instructs to occupy a front position;

the coordinated base station transmits a PDCCH 2, and one bit in the PDCCH 2 instructs to occupy a back position. If a transmission point transmits neither a PDCCH nor a PDSCH, a corresponding bit bit may be filled with 0. In this way, even if each base station performs independent scheduling, and does not know a scheduling status of another base station, the base station may correctly receive an ACK/a NACK fed back by the terminal device. A specific position of a feedback bit for each base station may be negotiated in advance.

Further, if one PUCCH can occupy a plurality of symbols or a plurality of slots/mini-slots, bits of the PUCCH may be allocated. For example, a bit bit of an ACK/a NACK for data from the serving transmission point is transmitted in a first symbol, a first slot, or a first mini-slot (or a first half time domain position of a resource), and a bit bit of an ACK/a NACK for data from the coordinated transmission point is transmitted in a second symbol, slot, or mini-slot (or a second half time domain position of the resource), and vice versa. Alternatively, a time domain resource position occupied by an ACK/a NACK fed back for a PDSCH corresponding to a PDCCH may be indicated in the PDCCH. For example, the time domain resource position is indicated by using ACK/NACK position—Ybit. A specific value of Y may be 1, to be specific, one bit is used for feedback, where a bit value of 0 may indicate that the occupied time domain resource position is a front time domain position, and a bit value of 1 indicates that the occupied time domain resource position is a back time domain position.

A specific example is as follows: For example, when the PUCCH occupies two symbols or two slots/mini-slots, a front position represents a resource position of a first symbol or slot/mini-slot, and a back position represents a resource position of a second symbol or slot/mini-slot, and vice versa. To be specific, for example, a serving base station transmits a PDCCH 1, and one bit in the PDCCH 1 instructs to occupy a front resource position; the coordinated base station transmits a PDCCH 2, and one bit in the PDCCH 2 instructs to occupy a back resource position. If a base station transmits neither a PDCCH nor a PDSCH, a bit bit on a corresponding resource may be filled with 0. In this way, even if each base station performs independent scheduling, and does not know a scheduling status of another base station, the base station may correctly receive an ACK/a NACK fed back by the terminal device. A specific resource position of a feedback bit for each base station may be negotiated in advance.

Further, different bits are transmitted based on slots/symbols. For example, a first slot is used to transmit an ACK/a NACK for a PDSCH corresponding to the PDCCH 1, and a second slot is used to transmit an ACK/a NACK for a PDSCH corresponding to the PDCCH 2. By analogy, for a short duration PUCCH in NR, different bits may be transmitted based on symbols. Different sequences or different cyclic shifts may be used for different slots/symbols.

Specifically, radio resource control (RRC) signaling or DCI may be used for indication. In other words, a plurality of sequences or a plurality of cyclic shifts may be configured for one PUCCH. To improve ACK/NACK performance when only one transmission point performs transmission, configurations may be exchanged between base stations. For example, during specific bit mapping, bits of ACKs/NACKs for different PDCCHs/PDSCHs may be mapped to different time domain resources.

According to the foregoing embodiment, the present invention provides a solution. To be specific, in a case of one PUCCH, the terminal device may feed back ACKs/NACKs when a plurality of PDCCHs are used to schedule coordinated transmission, so as to resolve a problem that ACKs/NACKs corresponding to a plurality of PDCCHs cannot be supported in the prior art, and improve performance of distributed MIMO multi-stream transmission in coordinated transmission, especially, when base stations perform independent scheduling.

Manner 2: The terminal device sends the feedback information by using a plurality of PUCCH resources.

It may be understood that a procedure of performing feedback by using the plurality of PUCCH resources is as follows: (1). The transmission point/terminal device determines the plurality of PUCCH resources. (2). The terminal device sends a PUCCH on the resource. (3) The transmission point receives the PUCCH on the resource, where there may be one or more transmission points.

It should be noted that if the terminal device performs feedback by using the plurality of PUCCH resources, the terminal device first needs to determine the PUCCH resources. Specifically, the PUCCH resources may be determined by using the following two methods.

In a first method, the terminal device determines, based on control channel elements in which the N downlink control channels are located, a target resource corresponding to each downlink control channel; or determines, based on control resource setting identifiers or search space setting identifiers included in the N downlink control channels, a target resource corresponding to each downlink control channel.

Figure 4:
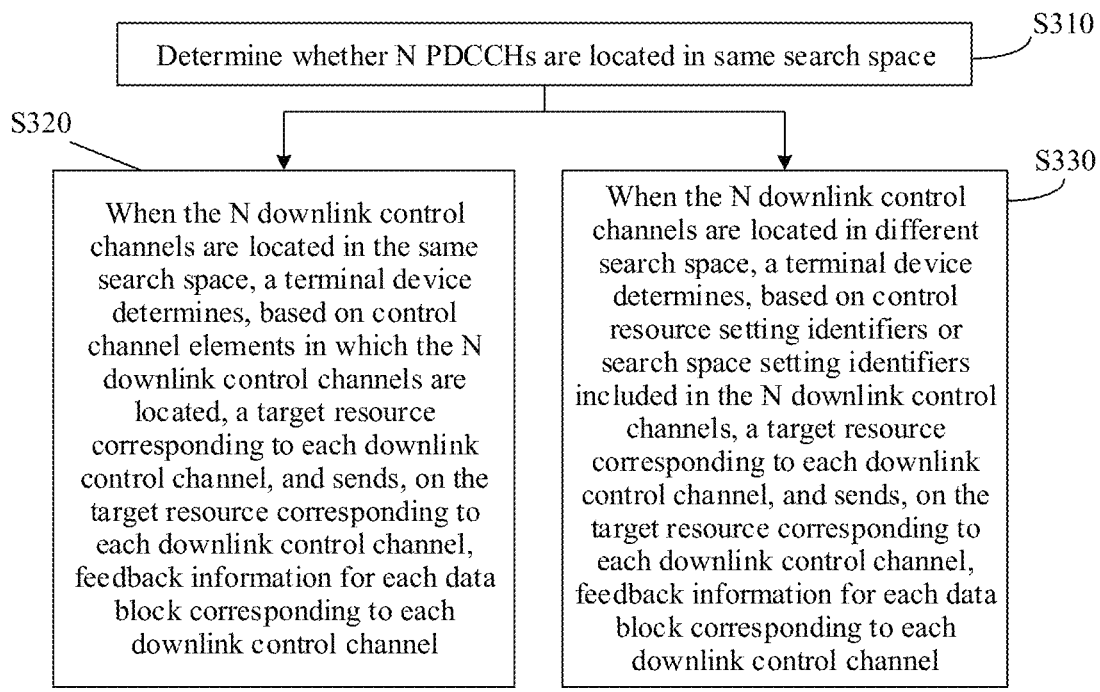
FIG. 4 is a flowchart of determining a PUCCH resource according to an embodiment of the present invention.

FIG. 4 is a flowchart of determining a PUCCH resource.

S310. Determine whether N PDCCHs are located in same search space.

S320. When the N downlink control channels are located in the same search space, a terminal device determines, based on control channel elements in which the N downlink control channels are located, a target resource corresponding to each downlink control channel, and sends, on the target resource corresponding to each downlink control channel, feedback information for each data block corresponding to each downlink control channel.

It may be understood that when the N PDCCHs are located in the same search space, the N PDCCHs are distinguished by using different CCEs.

For example, the terminal device receives two PDCCHs. If the two PDCCHs are in same search space, the terminal device may calculate each PUCCH resource position based on a CCE in which each PDCCH is located, determine numbers of two CCEs for one control resource setting identifier, and further determine two PUCCH resources.

For example, a PUCCH resource for feeding back an ACK/a NACK corresponding to data of a PDCCH 1 is as follows:

$$n_{PUCCH}^1 = n_{CCE}^1 + N_{PUCCH}^1.$$

A PUCCH resource for feeding back an ACK/a NACK corresponding to data of a PDCCH 2 is as follows:

$$n_{PUCCH}^2 = n_{CCE}^2 + N_{PUCCH}^2.$$

S330. When the N downlink control channels are located in different search space, a terminal device determines, based on control resource setting identifiers or search space setting identifiers included in the N downlink control channels, a target resource corresponding to each downlink control channel, and sends, on the target resource corresponding to each downlink control channel, feedback information for each data block corresponding to each downlink control channel.

It may be understood that when the N PDCCHs are located in different search space, the N PDCCHs are distinguished based on the control resource setting identifiers or the search space setting identifiers.

It should be noted that the terminal device needs to obtain information in a rule about a PUCCH resource, for example, information related to a control resource setting identifier or information related to a search space setting identifier. For example, a transmission point (base station) configures a set of a plurality of PUCCH resources for the terminal device, and the set of the PUCCH resources is related to control resource setting identifiers of PDCCHs. For example, a PUCCH resource identifier 1 is corresponding to a control resource setting identifier 1. In this case, the terminal device feeds back an ACK/a NACK for data on a PDCCH with the control resource setting identifier 1 on a resource corresponding to the PUCCH resource identifier 1.

It may be understood that the terminal device may determine the plurality of PUCCH resources by using configured offsets of the PUCCH resources. A specific offset value may be obtained by using RRC signaling or DCI signaling. For example, an offset indication of a start position of a PUCCH resource is configured for each control resource setting. Alternatively, no offset value is set for a serving transmission point, and an offset value is added for a coordinated transmission point. After determining a serving cell, the terminal device sends an ACK/a NACK to a coordinated cell based on the offset value.

Specifically, an example of the control resource setting is as follows:

```
Control resource SetConfig::=    SEQUENCE {
setConfigId          SetConfigId,
transmissionType     ENUMERATED {localised, distributed},
resourceBlockAssignment    SEQUENCE{
numberPRB-Pairs      ENUMERATED {n2, n4, n8},
resourceBlockAssignment    BIT STRING (SIZE(4..38))
},
dmrs-ScramblingSequenceInt  INTEGER (0..503),
pucch-ResourceStartOffset INTEGER (0..2047),
}
```

In addition, it should be noted that an indication of a PUCCH resource selection may be carried on each PDCCH. Specifically, four PUCCH resources may be indicated for each transmission point in RRC signaling, and a PUCCH configuration set identifier is indicated in DCI. In the DCI, one bit is used to indicate a specific set to which a PUCCH resource indicated in a current PDCCH belongs, for example, config ID. Alternatively, three bits are used to indicate a PUCCH resource in the DCI. For example, 000 to 011 in the PDCCH are used to indicate one of four PUCCH resources in a first set, and 100 to 111 in the PDCCH 2 are used to indicate one of four PUCCH resources in a second set (joint indication).

An example of a specific RRC signaling design is as follows:

(1) A plurality of PUCCH sets are configured in the RRC signaling, and a configuration identifier PUCCH configure ID is carried. Each PUCCH set may include a plurality of PUCCH resources.

```
PUCCH-ConfigDedicated-Cooperation ::=   SEQUENCE {
PUCCH configure ID       Config ID
startingPRB              INTEGER (0..109),
numberOfPRB              INTEGER (0..7)
startingSymbol/slot      INTEGER (0..14),
numberOfSymbol/slot      INTEGER (0..7)
n1PUCCH-AN-CS-v1130      CHOICE {
release                  NULL,
setup                    SEQUENCE {
n1PUCCH-AN-CS-ListP1     SEQUENCE (SIZE (2..4))
OF INTEGER (0..2047)
nPUCCH-Identity          INTEGER (0..503),
n1PUCCH-AN               INTEGER (0..2047)
}
}  OPTIONAL -- Need ON
}
```

An example of DCI signaling is as follows: PUCCH resource set indication–1 bits; and TPC command for PUCCH–2 bits.

The PUCCH resource set indication is used to indicate a PUCCH resource set identifier, and the TPC command for PUCCH is used to indicate a PUCCH resource in a corresponding set.

(2) One PUCCH set is configured in the RRC signaling, and the PUCCH set may include a plurality of PUCCH resources.

```
PUCCH-ConfigDedicated-Cooperation ::=   SEQUENCE {
startingPRB              INTEGER (0..109),
numberOfPRB              INTEGER (0..7)
startingSymbol/slot      INTEGER (0..14),
numberOfSymbol/slot      INTEGER (0..7)
n1PUCCH-AN-CS-v1130      CHOICE {
release                  NULL,
setup                    SEQUENCE {
n1PUCCH-AN-CS-ListP1     SEQUENCE (SIZE (2..8)) OF
INTEGER (0..2047)
nPUCCH-Identity-List     SEQUENCE (SIZE (2) OF INTEGER
(0..503),
n1PUCCH-AN-List          SEQUENCE (SIZE (2) OF INTEGER
(0..2047)
}
}  OPTIONAL -- Need ON
}
```

An example of DCI signaling is as follows:
TPC command for PUCCH—3 bits

| Value of 'TPC command for PUCCH' | $n_{PUCCH}^1$ Or $n_{PUCCH}^2$ |
|---|---|
| '000' | The 1st PUCCH resource value configured by higher layers |
| '001' | The 2nd PUCCH resource value configured by the higher layers |
| '...' | ... |
| '111' | The 8th PUCCH resource value configured by the higher layers |

Transmission points receive, on corresponding resources based on PUCCH resources corresponding to the transmission points, ACKs/NACKs fed back by the terminal device.

According to the foregoing embodiment, when a plurality of PUCCHs are designed in the present invention, the terminal device may feed back ACKs/NACKs when a plurality of PDCCHs are used to schedule coordinated transmission, so as to resolve a problem that ACKs/NACKs corresponding to a plurality of PDCCHs cannot be supported in the prior art, and improve performance of distributed MIMO multi-stream transmission in coordinated transmission, especially, when base stations perform independent scheduling.

Manner 3: The terminal device sends the feedback information based on piggyback indication information.

Figure 5:
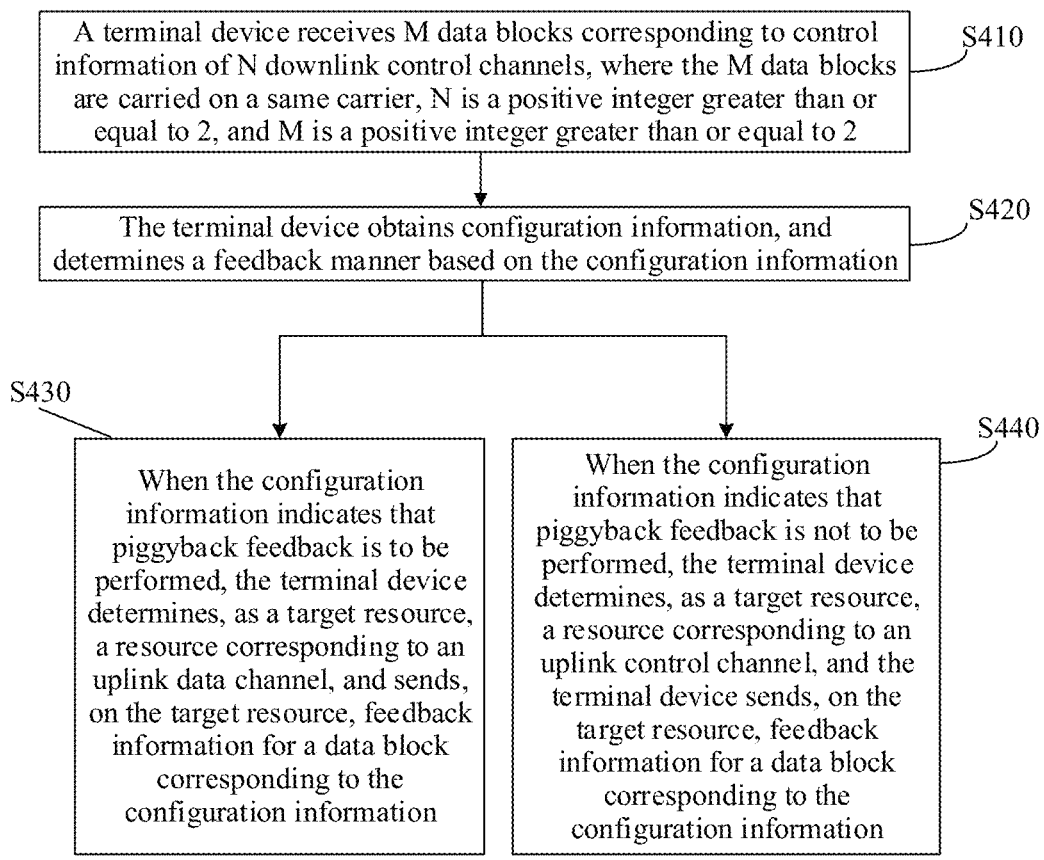
FIG. 5 is a schematic diagram of performing feedback based on piggyback information according to an embodiment of the present invention.

In addition, the terminal device may send the feedback information based on the piggyback indication information. The terminal device may perform feedback by using the piggyback indication information. For example, when receiving an indication indicating that piggyback is to be performed, the terminal device performs feedback through a PUSCH channel; or when receiving an indication indicating that piggyback is not to be performed, the terminal device performs feedback through a PUCCH. As shown in FIG. 5, a specific process is as follows.

S410. The terminal device receives M data blocks corresponding to control information of N downlink control channels, where the M data blocks are carried on a same carrier, N is a positive integer greater than or equal to 2, and M is a positive integer greater than or equal to 2.

The N pieces of downlink control information are corresponding to the N downlink control channels.

It may be understood that the N pieces of downlink control information are in a one-to-one correspondence with the N downlink control channels.

S420. The terminal device obtains configuration information, and determines a feedback manner based on the configuration information.

S430. When the configuration information indicates that piggyback feedback is to be performed, the terminal device determines, as a target resource, a resource corresponding to an uplink data channel, and sends, on the target resource, feedback information for a data block corresponding to the configuration information.

S440. When the configuration information indicates that it is determined that piggyback feedback is not to be performed, the terminal device determines, as a target resource, a resource corresponding to an uplink control channel, and the terminal device sends, on the target resource, feedback information for a data block corresponding to the configuration information.

For example, a transmission point may configure one-bit information or multi-bit information in a PDCCH to indicate whether piggyback can be applied to the feedback information.

For example, a serving transmission point may determine whether the terminal device has a PUSCH. Therefore, the serving transmission point may determine whether the terminal device adds feedback information to the PUSCH, so as to correctly receive the feedback information. A coordinated transmission point does not know whether the terminal device has the PUSCH. Therefore, the coordinated transmission point instructs the terminal device to add the feedback information to only a PUCCH instead of the PUSCH. It may be understood that the coordinated transmission point may not learn of whether the terminal device has the PUSCH. Therefore, the coordinated transmission point may instruct terminal device to transmit an ACK/a NACK only on the PUCCH regardless of whether there is the PUSCH.

A specific signaling design is as follows: One bit is used to indicate whether piggyback is to be performed. For example, 0 indicates that piggyback is not to be performed and the feedback information is transmitted on only the PUCCH, and 1 indicates that piggyback can be performed, and if the PUSCH exists, the ACK/NACK is transmitted on the PUSCH. After learning of this indication, the terminal device may determine whether the ACK/NACK for a PDSCH corresponding to the PDCCH is transmitted on the PUSCH or the PUCCH.

According to the foregoing embodiment, it may be learned that when a plurality of PUCCHs/PUSCHs are designed in the present invention, the terminal device may feed back ACKs/NACKs when a plurality of PDCCHs are used to schedule coordinated transmission, so as to resolve a problem that ACKs/NACKs corresponding to a plurality of PDCCHs cannot be supported in the prior art, and improve performance of distributed MIMO multi-stream transmission in coordinated transmission, especially, when base stations perform independent scheduling.

Optionally, when N=1, the M data blocks are corresponding to one piece of downlink control information.

Specifically, in this embodiment of the present invention, each of a plurality of transmission points may use a same downlink control channel such as a PDCCH. In other words, in this embodiment of the present invention, one piece of downlink control information includes downlink data transmission information of the plurality of transmission points. In this case, the terminal device may receive, based on one PDCCH (in other words, one piece of DCI), the M data blocks sent by the plurality of transmission points.

In this embodiment of the present invention, the feedback information for the M data blocks may be transmitted in the following manner.

The terminal device determines a target resource based on one downlink control channel.

The terminal device sends the feedback information for the N data blocks on the target resource.

Specifically, in a scenario in which the terminal device accesses only one serving transmission point (in other words, a serving cell), the feedback information for the M data blocks may be transmitted by using one time-frequency resource group.

It should be noted that, in this embodiment of the present invention, the target resource may include one or more (for example, two) physical uplink control channel (PUCCH) resources.

The time-frequency resource group may be obtained by using a preset function. The preset function may be a function in which an index of one control channel such as a PDCCH used by the N first transmission points is used as an input parameter. It should be noted that the index of the PDCCH may also be an index of a first CCE of the PDCCH. It should be understood that the foregoing enumerated PDCCH is only an example of a control channel, and this is not specifically limited in the present invention. The control channel may also be an EPDCCH. It should be noted that, if control information (in other words, scheduling information) of downlink data is sent by using the EPDCCH, the preset function may be a function in which an index of the EPDCCH is used an input parameter. It should be noted that the index of the EPDCCH may also be an index of a first ECCE of the EPDCCH.

Therefore, in coordinated multipoint multi-stream transmission, the terminal device simultaneously receives two pieces of downlink data from two transmission points. The two pieces of downlink data are corresponding to one control channel (for example, a PDCCH or an EPDCCH), in other words, corresponding to one piece of control information, and the one control channel or the one piece of control information is corresponding to one PUCCH resource group (including two or more PUCCH resources). In this case, the terminal device sends feedback information for one transmission point on one PUCCH resource in the PUCCH resource group, and sends feedback information for the other transmission point on another PUCCH resource in the PUCCH resource group. The two transmission points may include a serving transmission point (in other words, a serving cell) and a coordinated transmission point (in other words, a coordinated cell). Herein, the control channel or the control information may be sent by the serving transmission point (for example, a serving transmission point # A).

In addition, it should be noted that the transmission point may add position indication information, sequence indication information, bit quantity information, or piggyback indication information to the downlink control information or the downlink control channel. The position indication information is used to indicate a position of the feedback information in a resource corresponding to the uplink control channel. The sequence indication information is used to indicate a position of feedback information corresponding to each data block. The bit quantity information is used to indicate a quantity of bits of the feedback information (for example, one bit, two bits, and four bits). The piggyback indication information is used to indicate whether to perform piggyback feedback when the terminal device feeds back information. For example, one bit may be used to represent the piggyback indication information. When data in the bit is 1, it indicates that piggyback feedback is to be performed. When the data in the bit is 0, it indicates that the piggyback feedback is not to be performed.

Optionally, in this embodiment of the present invention, each of the plurality of transmission points sends a downlink control channel, and when the terminal device receives only one PDCCH, for feedback for data in the PDCCH, a feedback resource may alternatively be determined by using the method in the foregoing embodiment. Details are not described herein.

The foregoing describes the feedback information transmission method in the embodiments of the present invention in detail with reference to FIG. 2. The following describes a terminal device in the embodiments of the present invention in detail with reference to FIG. 6.

Figure 6:
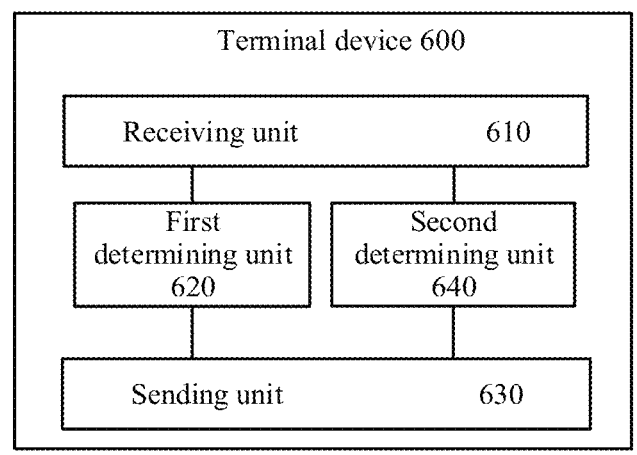
FIG. 6 is a schematic structural diagram of a terminal device according to an embodiment of the present invention.

FIG. 6 is a schematic block diagram of a terminal device 600 according to an embodiment of the present invention. As shown in FIG. 6, the terminal device 600 includes:

a receiving unit 610, configured to receive M data blocks corresponding to N pieces of downlink control information, where the M data blocks are carried on a same carrier, N is a positive integer greater than or equal to 2, and M is a positive integer greater than or equal to 2, where the N pieces of downlink control information are corresponding to N downlink control channels;

a first determining unit 620, configured to determine a target resource; and a sending unit 630, configured to send feedback information for the M data blocks on the target resource.

Optionally, the sending unit 630 is specifically configured to send the feedback information for the M data blocks on the target resource in a preset format, where the preset format is obtained from pre-stored information in the terminal device, or is obtained from the N pieces of downlink control information.

Optionally, the preset format includes a quantity of bits of the feedback information.

The sending unit 630 is specifically configured to send the feedback information for the M data blocks on the target resource based on the quantity of bits.

Optionally, the preset format includes an arrangement order of the feedback information.

The sending unit 630 is specifically configured to send the feedback information for the M data blocks on the target resource based on the arrangement order of the feedback information.

Optionally, the terminal device 600 further includes a second determining unit 640.

The second determining unit 640 is configured to: determine a quantity of symbols or slots corresponding to the target resource, and determine an arrangement order of the feedback information based on the quantity of symbols or slots corresponding to the target resource.

The sending unit 630 is specifically configured to send the feedback information for the M data blocks on the target resource based on the arrangement order of the feedback information.

Optionally, the first determining unit 620 is configured to determine the target resource based on configuration information, where the configuration information is information pre-stored in the terminal device, higher layer signaling, physical layer signaling, or information carried on the N downlink control channels.

Optionally, when the configuration information is information carried on a downlink control channel, the configuration information further includes piggyback indication information, and the piggyback indication information is used to indicate whether to perform piggyback feedback.

The first determining unit 620 is specifically configured to: when the piggyback indication information indicates that piggyback feedback is to be performed, determine, as the target resource, a resource corresponding to an uplink data channel.

The sending unit 630 is specifically configured to send, on the target resource, feedback information for a data block corresponding to the piggyback indication information.

Optionally, the first determining unit 620 is further configured to: when the piggyback indication information indicates that piggyback feedback is not to be performed, determine, as the target resource, a resource corresponding to an uplink control channel.

The sending unit 630 is specifically configured to send, on the target resource, feedback information for a data block corresponding to the piggyback indication information.

Optionally, the N pieces of downlink control information are corresponding to N downlink control channels.

The first determining unit 620 is configured to determine the target resource based on the N downlink control channels.

Specifically, the first determining unit 620 is configured to determine, based on control channel elements in which the N downlink control channels are located, a target resource corresponding to each downlink control channel. The sending unit 630 is configured to send, on the target resource corresponding to each downlink control channel, feedback information for each data block corresponding to each downlink control channel. The first determining unit 620 is configured to determine, based on control resource setting identifiers or search space setting identifiers included in the N downlink control channels, a target resource corresponding to each downlink control channel. The sending unit 630 is configured to send, on the target resource corresponding to each downlink control channel, feedback information for each data block corresponding to each downlink control channel.

The terminal device 600 in this embodiment of the present invention may be corresponding to the terminal device in the method in the embodiments of the present invention (for example, the feedback information transmission apparatus 600 may be configured as the terminal device or may be the terminal device). In addition, all units, namely, modules in the feedback information transmission apparatus 600 and the foregoing other operations and/or functions are separately used to implement corresponding procedures performed by the terminal device in the method 300 in FIG. 3. For brevity, details are not described herein.

According to the feedback information transmission apparatus in this embodiment of the present invention, in a coordinated multipoint multi-stream transmission technology, after receiving, by using a same carrier, a plurality of pieces of data transmitted by a plurality of transmission points, the terminal device sends feedback information for the plurality of pieces of data to the plurality of transmission points by using one or more time-frequency resources, so that the plurality of transmission points can learn of a receiving status of the transmitted data, thereby improving reliability of coordinated multipoint multi-stream transmission.

Figure 7:
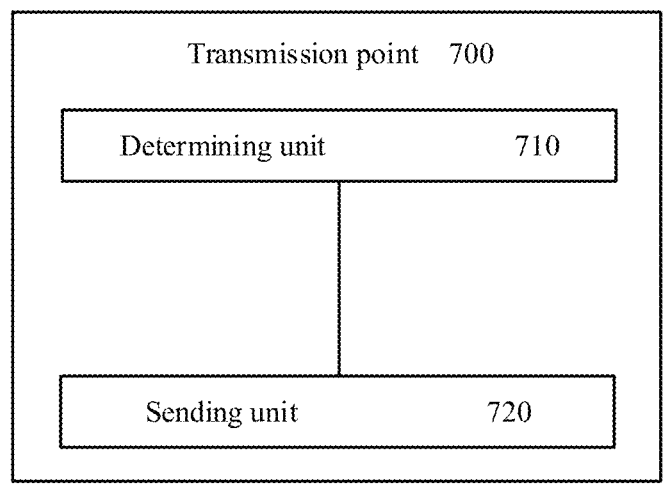
FIG. 7 is a schematic structural diagram of a transmission point according to an embodiment of the present invention.

FIG. 7 is a schematic block diagram of a transmission point 700 according to another embodiment of the present invention. As shown in FIG. 7, the transmission point 700 includes:

a determining unit 710, configured to determine information about a resource used to carry feedback information; and a sending unit 720, configured to send the information about the resource to a terminal device, so that the terminal device sends the feedback information by using the resource.

Optionally, the determining unit 710 is further configured to determine a quantity of bits of the feedback information. The sending unit 720 is further configured to send the quantity of bits of the feedback information to the terminal device, so that the terminal device performs feedback based on the quantity of bits.

Optionally, the determining unit 710 is further configured to determine a position of the feedback information. The sending unit 720 is further configured to send the position of the feedback information to the terminal device, so that the terminal device sends the feedback information in the position.

Optionally, the sending unit 720 is further configured to send piggyback indication information to the terminal device, so that the terminal device sends the feedback information based on the piggyback indication information, where the piggyback indication information is used to indicate whether to perform piggyback feedback.

All units, namely, modules in the transmission point 700 according to this embodiment of the present invention and the foregoing other operations and/or functions are separately used to implement corresponding procedures performed by the first transmission point in FIG. 2. For brevity, details are not described herein.

According to the feedback information transmission apparatus in this embodiment of the present invention, in a coordinated multipoint multi-stream transmission technology, after receiving, by using a same carrier, a plurality of pieces of data transmitted by a plurality of transmission points, the terminal device sends feedback information for the plurality of pieces of data to the plurality of transmission points by using one or more time-frequency resources, so that the plurality of transmission points can learn of a receiving status of the transmitted data, thereby improving reliability of coordinated multipoint multi-stream transmission.

Figure 8:
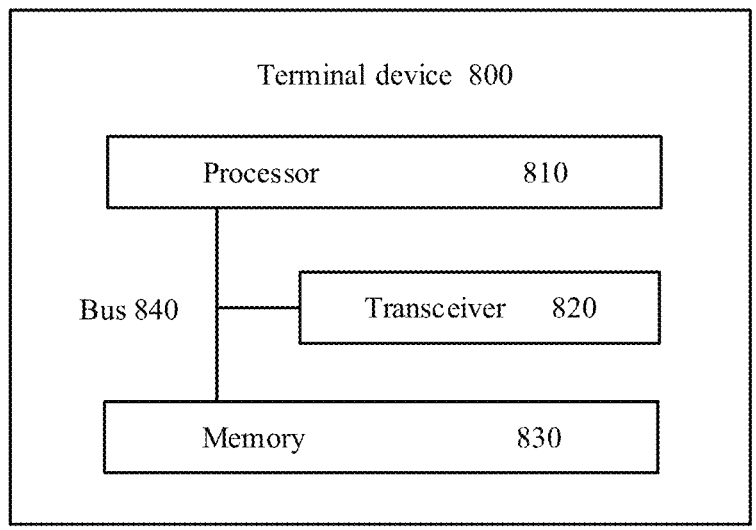
FIG. 8 is a physical structural diagram of a terminal device according to an embodiment of the present invention.
Figure 9:
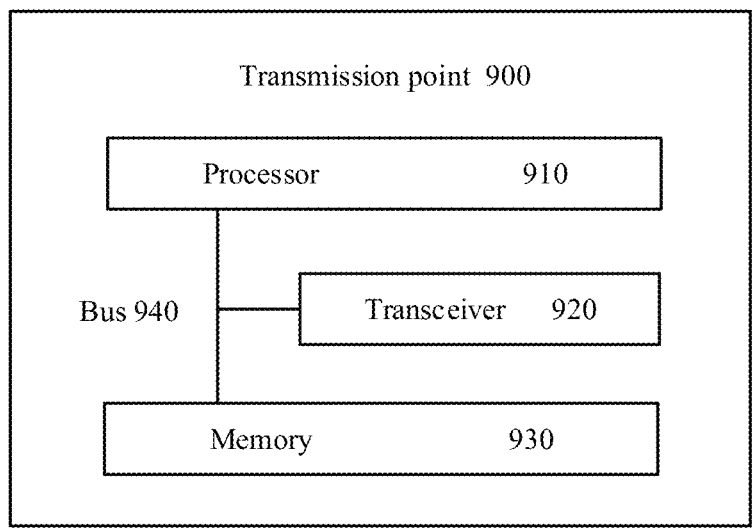
FIG. 9 is a physical structural diagram of a transmission point according to an embodiment of the present invention.

The foregoing describes the feedback information transmission method in the embodiments of the present invention in detail with reference to FIG. 6 The following describes feedback information transmission devices according to the embodiments of the present invention in detail with reference to FIG. 8 and FIG. 9.

FIG. 8 is a schematic block diagram of a terminal device 800 according to an embodiment of the present invention. As shown in FIG. 8, the terminal device 800 includes a processor 810 and a transceiver 820. The processor 810 is connected to the transceiver 820 by using a bus 840. Optionally, the device 800 further includes a memory 830, and the memory 830 is connected to the processor 810. The processor 810, the memory 830, and the transceiver 820 may be connected to each other by using the bus system 840. The memory 830 may be configured to store an instruction. The processor 810 is configured to execute the instruction stored in the memory 830, to control the transceiver 820 to send information or a signal.

The processor 810 may be corresponding to the first determining unit 620 in the apparatus 600 shown in FIG. 6, and the transceiver 820 may be corresponding to the sending unit 630 and the receiving unit 610 in the apparatus 600 in FIG. 6.

All units, namely, modules in the terminal device 800 and the foregoing other operations and/or functions are separately used to implement corresponding procedures performed by the terminal device in the method 300 in FIG. 3. For brevity, details are not described herein.

According to the feedback information transmission device in this embodiment of the present invention, in a coordinated multipoint multi-stream transmission technology, after receiving, by using a same carrier, a plurality of pieces of data transmitted by a plurality of transmission points, the terminal device sends feedback information for the plurality of pieces of data to the plurality of transmission points by using one or more time-frequency resources, so that the plurality of transmission points can learn of a receiving status of the transmitted data, thereby improving reliability of coordinated multipoint multi-stream transmission.

FIG. 9 is a schematic block diagram of a transmission point 900 according to another embodiment of the present invention. As shown in FIG. 9, the transmission point 900 includes a processor 910 and a transceiver 920. The processor 910 is connected to the transceiver 920 by using a bus 940. Optionally, the transmission point 900 further includes a memory 930, and the memory 930 is connected to the processor 910. The memory 930 may be configured to store an instruction. The processor 910 is configured to execute the instruction stored in the memory 930, to control the transceiver 920 to send information or a signal.

The processor 910 may be corresponding to the determining unit 710 in the apparatus 700 shown in FIG. 7, and the transceiver may be corresponding to the sending unit 720 in the apparatus 700 in FIG. 7.

All units, namely, modules in the transmission point 900 and the foregoing other operations and/or functions are separately used to implement corresponding procedures performed by the first transmission point in FIG. 2. For brevity, details are not described herein.

According to the feedback information transmission device in this embodiment of the present invention, in a coordinated multipoint multi-stream transmission technology, after receiving, by using a same carrier, a plurality of pieces of data transmitted by a plurality of transmission points, a terminal device sends feedback information for the plurality of pieces of data to the plurality of transmission points by using one or more time-frequency resources, so that the plurality of transmission points can learn of a receiving status of the transmitted data, thereby improving reliability of coordinated multipoint multi-stream transmission.

It should be understood that the processor in the embodiments of the present invention may be a central processing unit (CPU), or may be another general purpose processor, a digital signal processor (DSP), an application-specific integrated circuit (ASIC), a field-programmable gate array (FPGA) or another programmable logic device, a discrete gate or a transistor logic device, a discrete hardware component, or the like. The general purpose processor may be a microprocessor, or the processor may be any conventional processor or the like.

The memory may include a read-only memory and a random access memory, and provide an instruction and data for the processor. A part of the memory may further include a non volatile random access memory. For example, the memory may further store information about a device type.

In addition to a data bus, the bus system may further include a power bus, a control bus, a status signal bus, and the like. However, for clear description, various types of buses in the figures are marked as the bus system.

In an implementation process, the steps in the foregoing methods may be completed by using an integrated logic circuit of hardware in the processor, or by using an instruction in a form of software. The steps of the methods disclosed with reference to the embodiments of the present invention may be directly performed and completed by a hardware processor, or may be performed and completed by a combination of hardware and software modules in the processor. The software module may be located in a mature storage medium in the art, such as a random access memory, a flash memory, a read-only memory, a programmable read-only memory, or an electrically erasable programmable memory. The storage medium is located in the memory, and the processor reads information in the memory and completes the steps in the foregoing methods in combination with hardware of the processor. To avoid repetition, details are not described herein.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

It should be understood that in various embodiments of the present invention, sequence numbers of the foregoing processes do not mean execution sequences. The execution sequences of the processes should be determined based on functions and internal logic of the processes, and shall not constitute any limitation on the implementation processes of the embodiments of the present invention.

A person of ordinary skill in the art may be aware that, with reference to the examples described in the embodiments disclosed in this specification, units and algorithm steps can be implemented by using electronic hardware or a combination of computer software and electronic hardware. Whether these functions are executed in hardware or software mode depends on specific applications and design constraint conditions of the technical solutions. A person skilled in the art may use different methods to implement the described functions for each particular application, but it should not be considered that such implementation goes beyond the scope of the present invention.

It may be clearly understood by a person skilled in the art that, for the purpose of convenient and brief description, for a specific working process of the foregoing system, apparatus, and unit, refer to a corresponding process in the foregoing method embodiments. Details are not described herein.

In the several embodiments provided in this application, it should be understood that the disclosed system, apparatus, and method may be implemented in another manner. For example, the described apparatus embodiments are only examples. For example, division of the units is only logical function division. There may be other division in actual implementation. For example, a plurality of units or components may be combined or may be integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may be or may not be physically separate, and parts displayed as units may be or may not be physical units, may be located in one place, or may be distributed on a plurality of network units. Some or all of the units may be selected based on an actual requirement to achieve the objectives of the solutions of the embodiments.

In addition, functional units in the embodiments of the present invention may be integrated into one processing unit, or each of the units may exist alone physically, or two or more units may be integrated into one unit.

When the functions are implemented in a form of a software functional unit and sold or used as an independent product, the functions may be stored in a computer readable storage medium. Based on such an understanding, the technical solutions of the present invention essentially, in other words, the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present invention. The storage medium includes various media that can store program code, such as a USB flash drive, a removable hard disk, a read-only memory (ROM), a random access memory (RAM), a magnetic disk, or a compact disc.

The foregoing descriptions are only specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A feedback information transmission method, wherein the method comprises:
   receiving, by a terminal device, M data blocks corresponding to control information of N downlink control channels, wherein the M data blocks are carried on a same carrier frequency, N is a positive integer greater than or equal to 2, and M is a positive integer greater than or equal to 2;
   determining, by the terminal device, that the N downlink control channels are located in a same search space;

in response to determining that the N downlink control channels are located in the same search space, determining, by the terminal device, a target resource for uplink based on control channel elements in which the N downlink control channels are located, wherein determining the target resource comprises:
calculating a position of the target resource based on the control channel elements:
determining numbers of the control channel elements for a search space setting identifier; and
determining the target resource based on the search space setting identifier; and
sending, by the terminal device, feedback information for the M data blocks on the target resource, wherein the feedback information is in response to received data from the M data blocks.

2. The method according to claim 1, wherein the sending, by the terminal device, feedback information for the M data blocks on the target resource comprises:
sending, by the terminal device, the feedback information for the M data blocks on the target resource in a preset format, wherein the preset format is obtained from pre-stored information in the terminal device, or is obtained from the control information of N downlink control channels.

3. The method according to claim 2, wherein the preset format comprises a quantity of bits of the feedback information; and
the sending, by the terminal device, the feedback information for the M data blocks on the target resource in a preset format comprises:
sending, by the terminal device, the feedback information for the M data blocks on the target resource based on the quantity of bits of the feedback information.

4. The method according to claim 2, wherein the preset format comprises an arrangement order of the feedback information, wherein the arrangement order of the feedback information is determined based on a quantity of symbols or slots corresponding to the target resource; and
the sending, by the terminal device, the feedback information for the M data blocks on the target resource in a preset format comprises:
sending, by the terminal device, the feedback information for the M data blocks on the target resource based on the arrangement order of the feedback information.

5. The method according to claim 1, wherein the method further comprises:
determining, by the terminal device, a quantity of symbols or slots corresponding to the target resource;
determining an arrangement order of the feedback information based on the quantity of symbols or slots corresponding to the target resource; and wherein
the sending, by the terminal device, feedback information for the M data blocks on the target resource comprises:
sending, by the terminal device, the feedback information for the M data blocks on the target resource based on the arrangement order of the feedback information.

6. The method according to claim 1, wherein the determining, by the terminal device, a target resource comprises:
determining, by the terminal device, the target resource based on configuration information, wherein the configuration information is included in at least one of:
information pre-stored in the terminal device;
higher layer signaling;
physical layer signaling; or
information carried on the N downlink control channels.

7. The method according to claim 6, wherein when the configuration information is information carried on a downlink control channel, the configuration information further comprises piggyback indication information, and the piggyback indication information indicates whether to perform piggyback feedback;
the determining, by the terminal device, the target resource based on configuration information comprises:
when the piggyback indication information indicates that piggyback feedback is to be performed, determining, by the terminal device as the target resource, a resource corresponding to an uplink data channel; and
the sending, by the terminal device, feedback information for the M data blocks on the target resource comprises:
sending, by the terminal device on the target resource, feedback information for a data block corresponding to the piggyback indication information.

8. The method according to claim 6, wherein when the configuration information is information carried on a downlink control channel, the configuration information further comprises piggyback indication information, and the piggyback indication information indicates whether to perform piggyback feedback;
the determining, by the terminal device, the target resource based on configuration information comprises:
when the piggyback indication information indicates that piggyback feedback is not to be performed, determining, by the terminal device as the target resource, a resource corresponding to an uplink control channel; and
the sending, by the terminal device, feedback information for the M data blocks on the target resource comprises:
sending, by the terminal device on the target resource, feedback information for a data block corresponding to the piggyback indication information.

9. The method according to claim 1, wherein the determining, by the terminal device, a target resource comprises:
determining, by the terminal device, the target resource based on resource configuration information carried on the N downlink control channels.

10. The method according to claim 9, wherein the determining, by the terminal device, the target resource based on resource configuration information carried on the N downlink control channels comprises:
determining, by the terminal device based on control channel elements in which the N downlink control channels are located, a target resource corresponding to each downlink control channel; and
the sending, by the terminal device, feedback information for the M data blocks on the target resource comprises:
sending, by the terminal device on the target resource corresponding to each downlink control channel, feedback information for each data block corresponding to each downlink control channel.

11. A terminal device, wherein the terminal device comprises:
a non-transitory memory storage comprising instructions; and
one or more hardware processors in communication with the non-transitory memory storage, wherein the one or more hardware processors execute the instructions to cause the terminal device to:
receive M data blocks corresponding to control information of N downlink control channels, wherein the M data blocks are carried on a same carrier frequency, N is a positive integer greater than or equal to 2, M is a positive integer greater than or equal to 2;
determine, by the terminal device, that the N downlink control channels are located in a same search space;
in response to determining that the N downlink control channels are located in the same search space, determine a target resource for uplink based on control channel elements in which the N downlink control channels are located, wherein determining the target resource comprises:
calculating a position of the target resource based on the control channel elements;
determining numbers of the control channel elements for a search space setting identifier; and
determining the target resource based on the search space setting identifier; and
send feedback information for the M data blocks on the target resource, wherein the feedback information is in response to received data from the M data blocks.

12. The terminal device according to claim 11, wherein the one or more hardware processors execute the instructions to cause the terminal device to:
send the feedback information for the M data blocks on the target resource in a preset format, wherein the preset format is obtained from pre-stored information in the terminal device, or is obtained from the control information of N downlink control channels.

13. The terminal device according to claim 12, wherein the preset format comprises a quantity of bits of the feedback information; and
the one or more hardware processors execute the instructions to cause the terminal device to send the feedback information for the M data blocks on the target resource based on the quantity of bits of the feedback information.

14. The terminal device according to claim 12, wherein the preset format comprises an arrangement order of the feedback information, wherein the arrangement order of the feedback information is determined based on a quantity of symbols or slots corresponding to the target resource; and
the one or more hardware processors execute the instructions to cause the terminal device to send the feedback information for the M data blocks on the target resource based on the arrangement order of the feedback information.

15. The terminal device according to claim 11, wherein the one or more hardware processors execute the instructions to cause the terminal device to: determine a quantity of symbols or slots corresponding to the target resource;
determine an arrangement order of the feedback information based on the quantity of symbols or slots corresponding to the target resource; and
send the feedback information for the M data blocks on the target resource based on the arrangement order of the feedback information.

16. The terminal device according to claim 11, wherein the one or more hardware processors execute the instructions to cause the terminal device to:
determine the target resource based on configuration information, wherein the configuration information is included in at least one of:
information pre-stored in the terminal device;
higher layer signaling;
physical layer signaling; or
information carried on the N downlink control channels.

17. The terminal device according to claim 16, wherein when the configuration information is information carried on a downlink control channel, the configuration information further comprises piggyback indication information, and the piggyback indication information indicates whether to perform piggyback feedback; and
the one or more hardware processors execute the instructions to cause the terminal device to:
when the piggyback indication information indicates that piggyback feedback is to be performed, determine, as the target resource, a resource corresponding to an uplink data channel; and
send, on the target resource, feedback information for a data block corresponding to the piggyback indication information.

18. The terminal device according to claim 16, wherein when the configuration information is information carried on a downlink control channel, the configuration information further comprises piggyback indication information, and the piggyback indication information indicates whether to perform piggyback feedback; and
the one or more hardware processors execute the instructions to cause the terminal device to:
when the piggyback indication information indicates that piggyback feedback is not to be performed, determine, as the target resource, a resource corresponding to an uplink control channel; and
send, on the target resource, feedback information for a data block corresponding to the piggyback indication information.

19. The terminal device according to claim 11, wherein the control information of N downlink control channels comprises N pieces of downlink control information that are corresponding to the N downlink control channels; and
the target resource is determined based on the N pieces of downlink control information.

20. The terminal device according to claim 19, wherein the one or more hardware processors execute the instructions to cause the terminal device to:
determine, based on control channel elements in which the N downlink control channels are located, a target resource corresponding to each downlink control channel; and
send, on the target resource corresponding to each downlink control channel, feedback information for each data block corresponding to each downlink control channel.

* * * * *